No. 653,817. Patented July 17, 1900.
M. G. MORGAN.
SAFETY LOCK FOR HARVESTERS.
(Application filed Apr. 16, 1900.)
(No Model.)
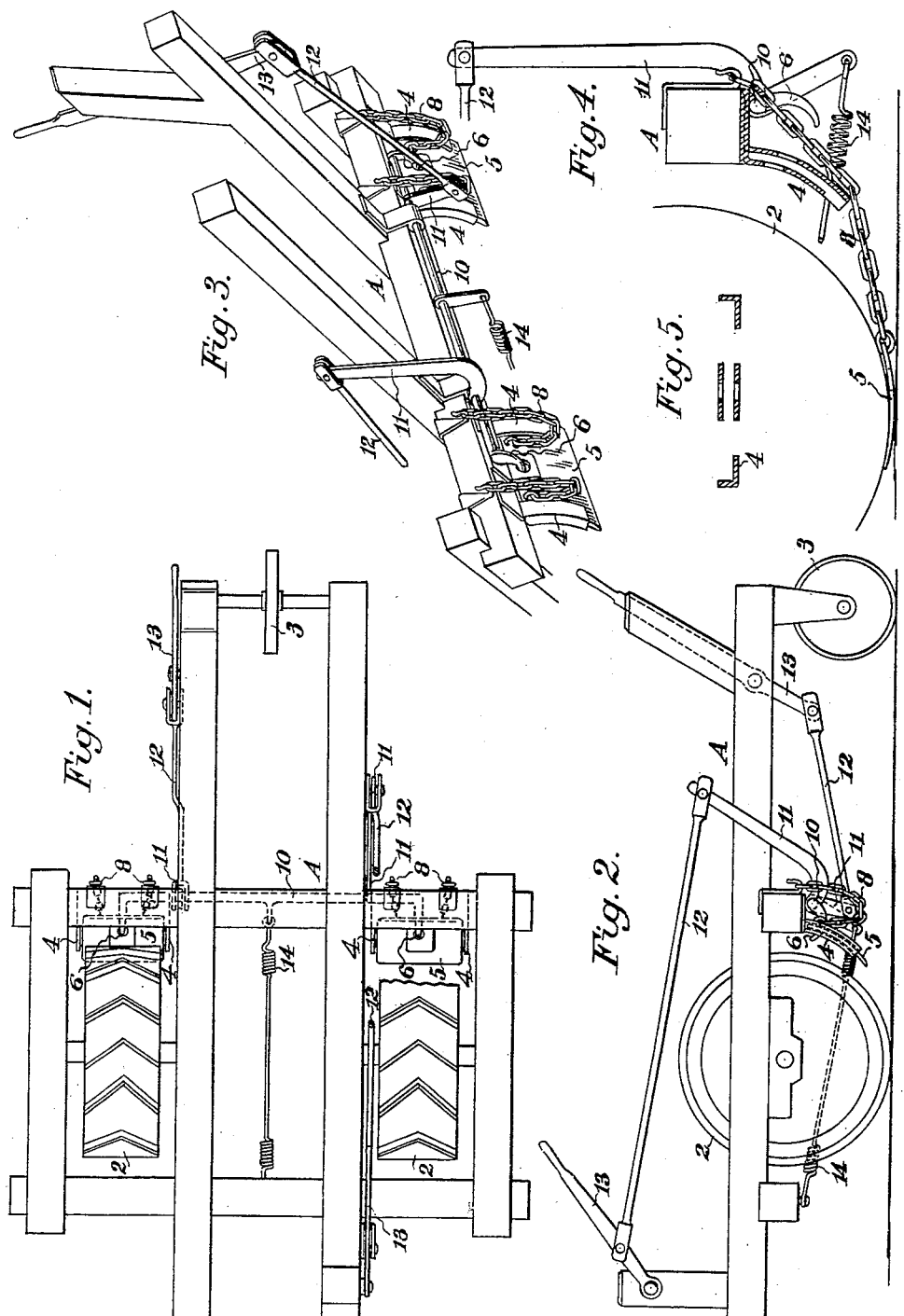
Witnesses,
Inventor,
Milford G. Morgan
by Dewey Strong & Co.
atty

UNITED STATES PATENT OFFICE.

MILFORD G. MORGAN, OF DIXON, CALIFORNIA.

SAFETY-LOCK FOR HARVESTERS.

SPECIFICATION forming part of Letters Patent No. 653,817, dated July 17, 1900.

Application filed April 16, 1900. Serial No. 13,055. (No model.)

*To all whom it may concern:*

Be it known that I, MILFORD G. MORGAN, a citizen of the United States, residing at Dixon, county of Solano, State of California, have invented an Improvement in Safety-Locks for Harvesters; and I hereby declare the following to be a full, clear, and exact description of the same.

My invention relates to a means for rendering large machinery, such as harvesters and the like, safe against accidents by reason of runaways.

It consists of shoes and means by which they are normally suspended in front of the main bearing-wheels, with devices by which they may be released at a critical time and allowed to drop, so that the wheels will run upon the shoes. These shoes are strongly connected with the frame of the machine by chains, so that they retain their position beneath the wheels and stop the rotation, and thus prevent damage to the machinery, and noise occasioned by its rapid rotation, in addition to their office as brakes or drags.

My invention also comprises details of construction, which will be more fully explained by reference to the accompanying drawings, in which—

Figure 1 is a plan of an agricultural machine with the safety-lock. Fig. 2 is a side elevation. Fig. 3 is a perspective view of the lock in an upturned position. Fig. 4 is a side view showing the lock in operation. Fig. 5 is a plan view of a guide.

There is always more or less danger in the employment of field machinery, such as mowing-machines, reapers, combined harvesters, and the like, from the running away of teams by which the machines are hauled about the field, and this danger increases with the number of animals in the team and the size of the machinery. It is most disastrous in combined harvesters, which are usually drawn by from eighteen to thirty animals, and as these machines weigh from five tons upward and contain a great deal of complicated mechanism the loss by runaway is very great. The animals usually become frightened at some noise, and having started the increased noise caused by the rapid motion of the machinery will soon render them ungovernable, and, besides breaking up the machinery, the animals themselves are often killed, and in some cases the operators connected with the machinery.

It is the object of my invention to provide a means for both checking the runaways and stopping the revolution of the machinery, and thus preventing the noise and damage thereto, which would be of great assistance in calming the team.

I have illustrated my invention by showing a part of the framework A and the bearing-wheels 2 of a threshing-machine portion of a combined harvester, with a single wheel 3 in front, which represents the steering-wheel usually employed upon such machines, but without being strictly accurate.

In front of the wheels 2 are curved guides 4, and within these guides shoes 5 are slidable. Suitably located with relation to these shoes are holding-arms 6, which may be connected in any suitable manner with levers or disengaging devices, so that when released the shoes will drop out of their retaining-slides and pass beneath the wheels 2. Strong chains 8 are fixed to the shoes and suitably connected with the frame of the machine, so that when the shoes have passed beneath the wheels the latter, resting upon the shoes, will cease their revolution, and any power applied toward drawing the machine will simply drag it upon these shoes, which will offer a very considerable resistance to the movement of the machine. One of the principal values, however, is in the cessation of the revolution of the wheels and the consequent stopping of all the machinery which is driven by connection with them. This prevents damage to the machinery, and by stopping the noise caused by its revolution it assists in quieting the frightened team.

When the machine is stopped, it is only necessary to move it backward until the wheels are clear of the shoes, when the latter may be slipped into their holding-guides and held by the latches 6, as previously described. The shoes may be released by loosening the chains to allow the wheels to pass off the shoes.

As here shown, the holding devices or latches consist of arms upon a shaft 10, which is suitably journaled to some part of the machine, so that the latches may engage with holes or sockets in the shoes.

I have here shown the shaft 10 as having one or more rocker-arms 11, which are connected by rods 12 with levers 13, mounted upon various parts of the machine, so that either the driver or any operator who may be upon the machine can at the first warning of danger disengage the shoes and allow them to pass beneath the wheels of the vehicle.

Any suitable disengaging device may be used. The latches may either be held in place by springs which yield to a pull upon the levers, or the levers themselves may be so devised as to engage and retain in a compressed state springs 14, which when released will act to withdraw the latches and disengage them from the slides.

I do not limit myself to any special mechanism by which this can be effected, as it will be manifest that it may be done in many ways which are mechanically equivalent and which will suggest themselves to the operator.

Having thus described my invention, what I claim as new, and desire to secure by Letters Patent, is—

1. The combination with a harvester and the like of shoes, guides and latches by which said shoes are normally retained in the guides, means by which the latches may be disengaged to allow the shoes to slide out by the guides, and slide beneath the wheels of the machine, and chains connecting the shoes with the frame whereby they are retained in position so that the machine is supported directly upon them.

2. The combination with a harvester or the like of shoes connected with a portion of the framework by chains and adapted when the chains are extended to lie beneath and support the wheels of the machine, curved guides fixed to the frame in front of the wheels so as to receive the shoes, latches carried upon supporting-shafts or the like and adapted to engage and hold the shoes normally in the guides, and levers connecting therewith by which the latches may be disengaged to allow the shoes to pass beneath the wheels.

In witness whereof I have hereunto set my hand.

MILFORD G. MORGAN.

Witnesses:
S. H. NOURSE,
JESSIE C. BRODIE.